United States Patent [19]
Clark

[11] Patent Number: 5,838,228
[45] Date of Patent: Nov. 17, 1998

[54] SYSTEM FOR PREVENTING REAR AND COLLISIONS

[76] Inventor: Dennis D. Clark, 2412 Lakeshore Dr., Sagle, Id. 83860

[21] Appl. No.: 933,064

[22] Filed: Sep. 18, 1997

[51] Int. Cl.⁶ .................................................. B60Q 1/00
[52] U.S. Cl. .................. 340/436; 340/435; 340/463; 340/479; 340/903; 367/909
[58] Field of Search ..................... 340/436, 435, 340/903, 901, 904, 479, 463, 468, 464, 467; 367/909

[56] References Cited

U.S. PATENT DOCUMENTS

| | | | |
|---|---|---|---|
| 4,800,471 | 1/1989 | Lippert | 340/479 |
| 4,890,091 | 12/1989 | Gage, Sr. et al. | 340/467 |
| 5,502,432 | 3/1996 | Ohmamyuda et al. | 340/436 |
| 5,684,474 | 11/1997 | Gilon et al. | 340/463 |

*Primary Examiner*—Nina Tong

[57] ABSTRACT

A system for preventing rear end collisions is provided including a warning light housing with a transparent panel mounted to a rear of the vehicle. A distance detector is directed toward a rear of the vehicle. The distance detector is adapted to detect a distance from a following car. A bulb is provided for illuminating upon the actuation thereof. Finally, control circuitry is connected between the distance detector, bulb, a speedometer, and a battery of the vehicle. The control circuitry is adapted for receiving a speed of the vehicle from the speedometer and further to calculate a distance per speed value, whereby the control circuitry actuates the bulb only upon the distance per speed value being lower than a predetermined value.

5 Claims, 2 Drawing Sheets

SYSTEM FOR PREVENTING REAR AND COLLISIONS

BACKGROUND OF THE INVENTION

1. Field of the Invention

The present invention relates to distance detectors and more particularly pertains to a new system for preventing rear end collisions for the purpose of preventing rear end collisions by notifying a following driver that he or she is following too close.

2. Description of the Prior Art

The use of distance detectors is known in the prior art. More specifically, distance detectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art distance detectors include U.S. Pat. No. 5,162,794; U.S. Pat. No. 5,091,726; U.S. Pat. No. Des. 354,243; U.S. Pat. No. 4,833,469; U.S. Pat. No. 4,561,064; and U.S. Pat. No. 5,229,975.

In these respects, the system for preventing rear end collisions according to the present invention substantially departs from the conventional concepts and designs of the prior art, and in so doing provides an apparatus primarily developed for the purpose of preventing rear end collisions by notifying a following driver that he or she is following too close.

SUMMARY OF THE INVENTION

In view of the foregoing disadvantages inherent in the known types of distance detectors now present in the prior art, the present invention provides a new system for preventing rear end collisions construction wherein the same can be utilized for preventing rear end collisions by notifying a following driver that he or she is following too close.

The general purpose of the present invention, which will be described subsequently in greater detail, is to provide a new system for preventing rear end collisions apparatus and method which has many of the advantages of the distance detectors mentioned heretofore and many novel features that result in a new system for preventing rear end collisions which is not anticipated, rendered obvious, suggested, or even implied by any of the prior art distance detectors, either alone or in any combination thereof.

To attain this, the present invention generally comprises a warning light housing with a rectangular configuration. The warning light housing has a front face, a rear face, a bottom face, a top face, and a pair of side faces coupled therebetween thus defining an interior space, as shown in FIG. 1. The front face has a cutout formed therein over which a transparent panel is coupled. A bulb is situated within the warning light housing for illuminating upon the actuation thereof. A mounting assembly is provided including a sleeve connected to the bottom face of the warning light housing. The sleeve has a channel with a square cross-section and two pairs of oval cutouts formed in a front face and a rear face of the sleeve. The channel is further equipped with a pair of side openings situated about an axis parallel and offset from the bottom face of the mounting assembly. The mounting assembly further includes a pair of mounting arms each having a square cross-section and slidably situated within the channel. Such arms each extend from an associated one of the side openings. Each mounting arm has a pair of oval bores formed therein in a side-by-side relationship. A pair of bolts may each be situated through a first one of the oval bores of the corresponding mounting arm and fixedly coupled between a corresponding pair of the oval cutouts. By such interconnection, the extent to which the mounting sleeve extends from the associated side opening is limited. While not shown, a second one of the oval bores of each mounting arm receives a bolt which is, in turn, threadedly engaged with a threaded aperture which is normally employed to couple a license plate to a rear of a vehicle. As shown in the Figures, a distance detector is situated on the mounting sleeve and directed toward a rear of the vehicle. In use, the distance detector is adapted to detect a distance from a following car. Finally, control circuitry is situated within the warning light housing and connected between the distance detector, bulb, a speedometer, and a battery of the vehicle. The control circuitry, which takes the form of a microprocessor or the like, functions to receive a speed of the vehicle from the speedometer and further to calculate a distance per speed value. The control circuitry further serves to intermittently actuate. the bulb only upon the distance per speed value being lower than one foot per mile/hour.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new system for preventing rear end collisions apparatus and method which has many of the advantages of the distance detectors mentioned heretofore and many novel features that result in a new system for preventing rear end collisions which is not anticipated, rendered obvious, suggested, or even implied by any of the prior art distance detectors, either alone or in any combination thereof.

It is another object of the present invention to provide a new system for preventing rear end collisions which may be easily and efficiently manufactured and marketed.

It is a further object of the present invention to provide a new system for preventing rear end collisions which is of a durable and reliable construction.

An even further object of the present invention is to provide a new system for preventing rear end collisions which is susceptible of a low cost of manufacture with regard to both materials and labor, and which accordingly is then susceptible of low prices of sale to the consuming public, thereby making such system for preventing rear end collisions economically available to the buying public.

Still yet another object of the present invention is to provide a new system for preventing rear end collisions which provides in the apparatuses and methods of the prior art some of the advantages thereof, while simultaneously overcoming some of the disadvantages normally associated therewith.

Still another object of the present invention is to provide a new system for preventing rear end collisions for the purpose of preventing rear end collisions by notifying a following driver that he or she is following too close.

Even still another object of the present invention is to provide a new system for preventing rear end collisions that includes a warning light housing with a transparent panel mounted to a rear of the vehicle. A distance detector is directed toward a rear of the vehicle. The distance detector is adapted to detect a distance from a following car. A bulb is provided for illuminating upon the actuation thereof. Finally, control circuitry is connected between the distance detector, bulb, a speedometer, and a battery of the vehicle. The control circuitry is adapted for receiving a speed of the vehicle from the speedometer and further to calculate a distance per speed value, whereby the control circuitry actuates the bulb only upon the distance per speed value being lower than a predetermined value.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
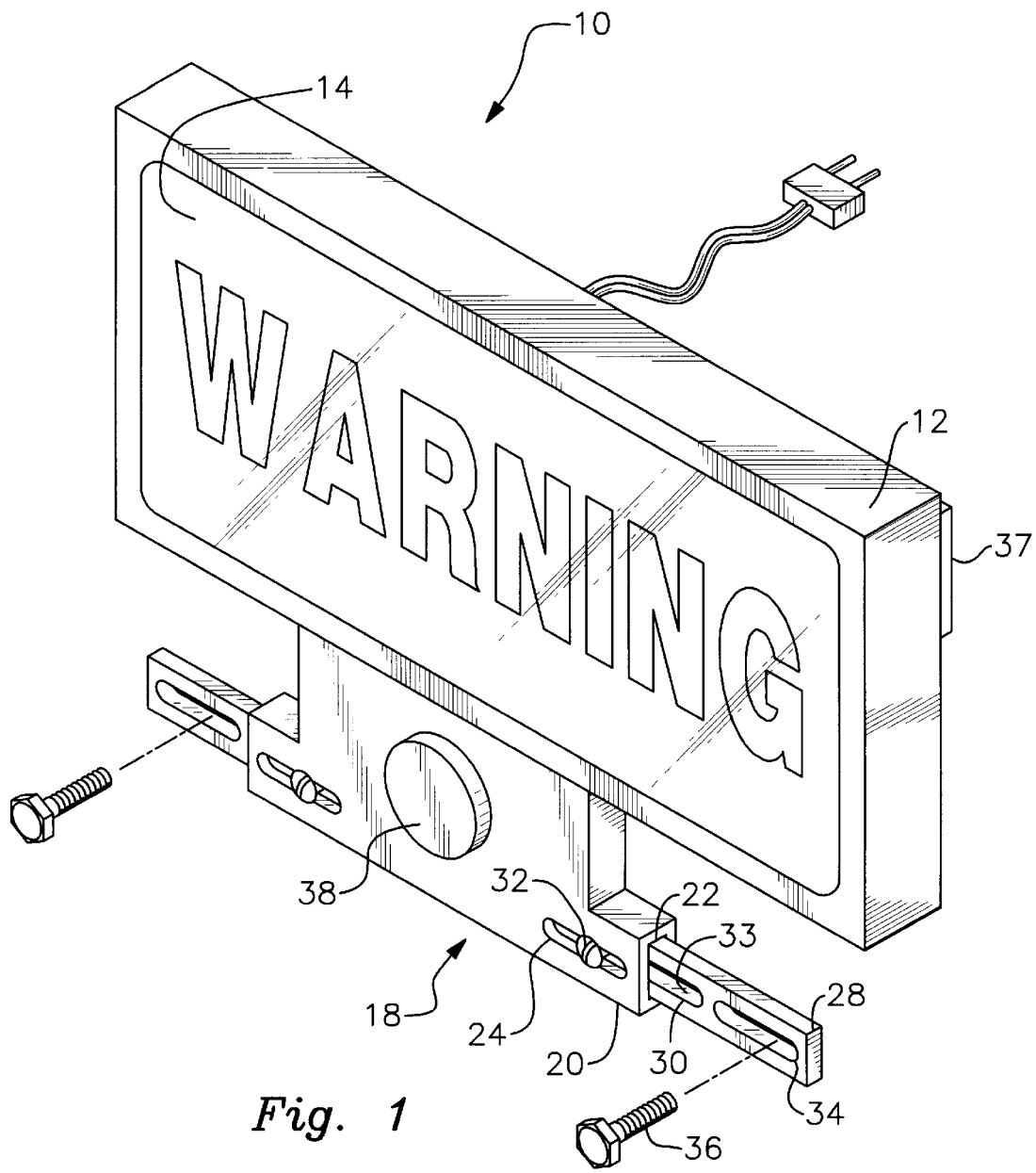
FIG. 1 is a perspective view of a new system for preventing rear end collisions according to the present invention.
Figure 2:
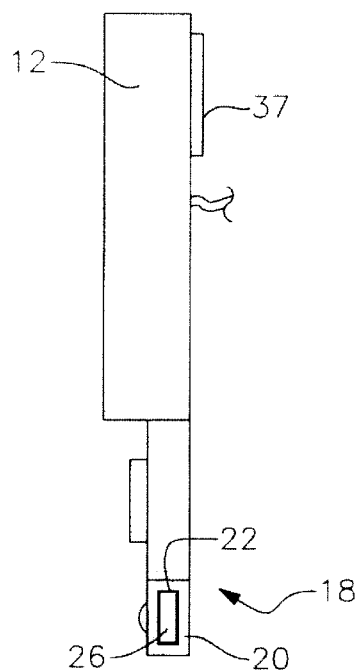
FIG. 2 is a side view of the present invention.
Figure 3:
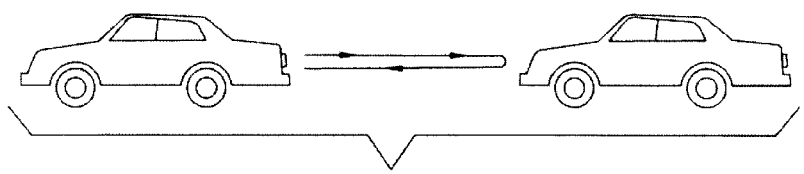
FIG. 3 is another side view of the present invention.
Figure 4:
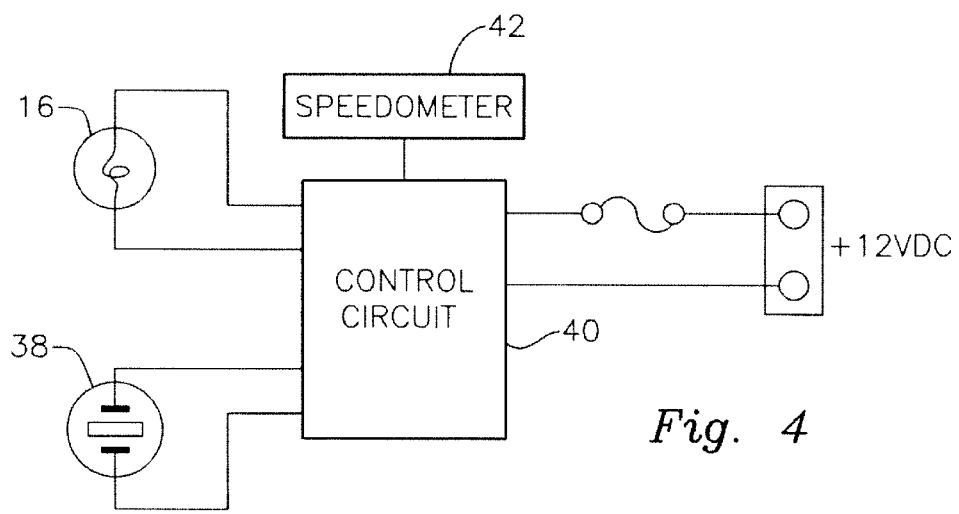
FIG. 4 is a schematic diagram of the various components of the present invention.

With reference now to the drawings, and in particular to FIGS. 1 through 4 thereof, a new system for preventing rear end collisions embodying the principles and concepts of the present invention and generally designated by the reference numeral 10 will be described.

The present invention, as designated as numeral 10, includes a warning light housing 12 with a rectangular configuration. The warning light housing has a front face, a rear face, a bottom face, a top face, and a pair of side faces coupled therebetween thus defining an interior space, as shown in FIG. 1. The front face has a cutout formed therein over which a transparent panel 14 is coupled. Such transparent panel has the word "WARNING" printed thereon. A bulb 16 is situated within the warning light housing for illuminating upon the actuation thereof.

A mounting assembly 18 is provided including a sleeve 20 connected to the bottom face of the warning light housing. The sleeve has a channel 22 with a square cross-section and two pairs of oval cutouts 24 formed in a front face and a rear face thereof. The channel is further equipped with a pair of side openings 26 situated about an axis parallel and offset from the bottom face of the mounting assembly.

The mounting assembly further includes a pair of mounting arms 28 each having a square cross-section and slidably situated within the channel. Such arms each extend from an associated one of the side openings. Each mounting arm has a pair of oval bores 30 formed therein in a side-by-side relationship. A pair of bolts 32 may each be situated through a first one of the oval bores 33 of the corresponding mounting arm and fixedly coupled between a corresponding pair of the oval cutouts of the sleeve. Such fixed coupling is preferably afforded by way of a nut which engages the bolt and abuts the rear of the sleeve. By such interconnection, the extent to which the mounting sleeve extends from the associated side opening is limited.

While not shown, a second one of the oval bores 34 of each mounting arm receives a bolt 36 which is, in turn, threadedly engaged with an unillustrated threaded aperture that is normally employed to couple a license plate to a rear of a vehicle. Preferably, the rear face of the warning light housing is equipped with a magnet 37 for further coupling with the body of the vehicle.

As shown in the Figures, a distance detector 38 is situated on the mounting sleeve and directed toward a rear of the vehicle. In use, the distance detector is adapted to detect a distance from a following car. This may be accomplished by way of an infrared transmitter and receiver or the like and a circuit adapted to track the time in which it takes the infrared beam to be reflected and further multiply the velocity of the beam and the time.

Finally, control circuitry 40 is situated within the warning light housing and connected between the distance detector, bulb, a speedometer 42, and a battery of the vehicle. The control circuitry, which takes the form of a microprocessor or the like, functions to receive a speed of the leading vehicle from the speedometer and further calculate a distance per speed value. The control circuitry further serves to intermittently actuate the bulb only upon the distance per speed value being lower than one foot per mile/hour. As such, a following driver is warned that he or she is traveling to close.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for preventing rear end collisions comprising, in combination:

a warning light housing with a rectangular configuration having a front face, a rear face, a bottom face, a top face, and a pair of side faces thereby defining an interior space, the front face having a cutout formed therein over which a transparent panel is coupled;

a mounting assembly including a sleeve connected to the bottom face of the warning light housing with a channel having a square cross-section and two pairs of oval cutouts formed in a front face and a rear face of the sleeve, the channel having a pair of side openings situated about an axis parallel and offset from the bottom face of the mounting assembly, the mounting assembly further including a pair of mounting arms each having a square cross-section and slidably situated within the channel and extending from an associated one of the side openings, each mounting arm having a pair of oval bores formed therein in a side-by-side relationship, whereby a pair of bolts may each be situated through a first one of the oval bores of the corresponding mounting arm and fixedly coupled between a corresponding pair of the oval cutouts thereby limiting the extent to which the mounting sleeve extends from the associated side opening;

whereby a second one of the oval bores of each mounting arm receives a bolt which in turn is threadedly engaged with a threaded aperture employed to couple a license plate to a rear of a vehicle;

a distance detector situated on the mounting sleeve and directed toward a rear of the vehicle, the distance detector adapted to detect a distance from a following car;

a bulb situated within the warning light housing for illuminating upon the actuation thereof; and control circuitry situated within the warning light housing and connected between the distance detector, bulb, a speedometer, and a battery of the vehicle, the control circuitry adapted for receiving a speed of the vehicle from the speedometer and further to calculate a distance per speed value, whereby the control circuitry intermittently actuates the bulb only upon the distance per speed value being lower than one foot per mile/hour.

2. A system for preventing rear end collisions comprising:

a warning light housing with a transparent panel mounted to a rear of the vehicle;

a distance detector directed toward a rear of the vehicle, the distance detector adapted to detect a distance from a following car;

a bulb for illuminating upon the actuation thereof;

control circuitry connected between the distance detector, bulb, a speedometer, and a battery of the vehicle, the control circuitry adapted for receiving a speed of the vehicle from the speedometer and further to calculate a distance per speed value, whereby the control circuitry actuates the bulb only upon the distance per speed value being lower than a predetermined value; and a mounting assembly including a sleeve connected to a bottom face of the warning light housing with a channel having a square cross-section and two pairs of oval cutouts formed in a front face and a rear face of the sleeve, the channel having a pair of side openings situated about an axis parallel and offset from the bottom face of the mounting assembly, the mounting assembly further including a pair of mounting arms each having a square cross-section and slidably situated within the channel and extending from an associated one of the side openings, each mounting arm having a pair of oval bores formed therein in a side-by-side relationship, whereby a pair of bolts may each be situated through a first one of the oval bores of the corresponding mounting arm and fixedly coupled between a corresponding pair of the oval cutouts thereby limiting the extent to which the mounting sleeve extends from the associated side opening, whereby a second one of the oval bores of each mounting arm receives a bolt which in turn is threadedly engaged with a threaded aperture employed to couple a license plate to a rear of a vehicle.

3. A system for preventing rear end collisions as set forth in claim 2 wherein the bulb is actuated intermittently.

4. A system for preventing rear end collisions as set forth in claim 2 wherein the warning light housing is mounted adjacent to a license plate of the vehicle.

5. A system for preventing rear end collisions as set forth in claim 2 wherein the distance detector is mounted adjacent the warning light housing.

* * * * *